(12) United States Patent
Eck et al.

(10) Patent No.: US 6,427,053 B1
(45) Date of Patent: Jul. 30, 2002

(54) METHOD AND APPARATUS FOR MONITORING PARAMETERS CORRESPONDING TO OPERATION OF AN ELECTROPHOTOGRAPHIC MARKING MACHINE

(75) Inventors: Edward M. Eck, Lima; Matthias H. Regelsberger, Rochester; Philip Stern, Spencerport; David Hockey, Brockport, all of NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/824,445

(22) Filed: Apr. 2, 2001

Related U.S. Application Data

(63) Continuation-in-part of application No. 09/572,524, filed on May 17, 2000.

(51) Int. Cl.[7] .............................................. G03G 15/00
(52) U.S. Cl. ........................................ 399/10; 358/1.14
(58) Field of Search ........................... 399/8, 9, 10, 11, 399/31; 358/1.14, 406; 702/187, 188; 714/25, 26, 37

(56) References Cited

U.S. PATENT DOCUMENTS

| | | | |
|---|---|---|---|
| 4,910,625 A | 3/1990 | Albrecht et al. | |
| 5,038,319 A | 8/1991 | Carter et al. | |
| 5,146,269 A | 9/1992 | Shimizu et al. | 355/200 |
| 5,680,541 A | * 10/1997 | Kurosu et al. | 714/26 |
| 5,777,896 A | 7/1998 | Artia et al. | 364/550 |
| 5,862,433 A | 1/1999 | Regelsberger et al. | |
| 5,923,834 A | 7/1999 | Thieret et al. | |
| 6,016,204 A | * 1/2000 | Budnik et al. | 358/1.14 |
| 6,021,285 A | * 2/2000 | Mestha et al. | 399/9 |
| 6,108,492 A | * 8/2000 | Miyachi | 358/1.15 |

FOREIGN PATENT DOCUMENTS

JP 63285413 11/1988

* cited by examiner

*Primary Examiner*—Joan Pendegrass

(57) ABSTRACT

An electrophotographic marking machine is described including a first set of data with a plurality of parameters corresponding to a plurality of prior electrophotographic markings or frames. The electrophotographic marking machine further includes a second set of data selected from the first set of data based upon a predetermined set of criteria. In addition, the electrophotographic marking machine has a volatile storage device for storing the first set of data, and a non-volatile storage device for storing the second set of data. A method for assessing operability of an electrophotographic marking machine is also described. The method includes the steps of recording a first set of data including a plurality of parameters corresponding to a plurality of prior electrophotographic markings, storing the first set of data in a volatile storage device, selecting a second set of data from the first set of data based upon a predetermined set of criteria, and storing the second set of data in a non-volatile storage device.

20 Claims, 8 Drawing Sheets

METHOD AND APPARATUS FOR MONITORING PARAMETERS CORRESPONDING TO OPERATION OF AN ELECTROPHOTOGRAPHIC MARKING MACHINE

CROSS REFERENCE TO RELATED APPLICATION

This is a continuation-in-part application of U.S. patent application Ser. No. 09/572,524, entitled "Method and Apparatus For Monitoring Parameters Corresponding To Operation Of An Electrophotographic Marking Machine," and filed on May 17, 2000.

FIELD OF INVENTION

This invention relates to electrophotographic marking machines, and more specifically to an apparatus and method for monitoring and storing operating parameters of the marking machine.

BACKGROUND OF THE INVENTION

In servicing and repairing electrophotographic (EP) marking machines, it has long been observed that the accurate analysis of the root cause of a functional failure or malfunction is critical in the successful implementation of the proper repair. Accurate and quick error analysis reduces the costs for troubleshooting itself as well as the costs for replacement parts. Any tools suited to the effective and accurate troubleshooting of malfunctions will ultimately yield higher customer satisfaction.

In addition, most consumables and components are replaced in accordance with manufacturer's recommendation which is based on copy or page-count. The end-of-life for the component or consumable is thus inferred rather than measured. As the copy count does not accurately reflect power-up and power-downs of the machine as well as ambient operating conditions, maintenance based on copy or page counts is inherently unreliable.

Therefore, a need exists for monitoring the operating conditions of an EP marking machine, wherein the operating parameters correspond to actual usage of the machine. A need also exists for permitting error analysis and trend analysis, and for recording information corresponding to such analyses in order to enable a field/service engineer to troubleshoot/repair the EP marking machine. Similarly, a need exists to be able to store error/failure information in at least volatile memory, as well as to be able to store certain critical error/failure information in permanent (i.e., non-volatile) storage, such as a hard disk.

SUMMARY OF THE INVENTION

The present application provides an electrophotographic marking machine comprising a first set of data including a plurality of parameters corresponding to a plurality of prior electrophotographic markings or frames. The electrophotographic marking machine of the present invention further comprises a second set of data selected from the first set of data based upon a predetermined set of criteria. In addition, the electrophotographic marking machine of the present invention comprises a volatile storage device for storing the first set of data, and a non-volatile storage device for storing the second set of data.

The present application provides a method for assessing operability of an electrophotographic marking machine. The method of the present invention comprises the steps of recording a first set of data including a plurality of parameters corresponding to a plurality of prior electrophotographic markings, and storing the first set of data in a volatile storage device. The method of the present invention further comprises the steps of selecting a second set of data from the first set of data based upon a predetermined set of criteria, and storing the second set of data in a non-volatile storage device.

DETAILED DESCRIPTION OF PREFERRED EMBODIMENTS

Figure 1:
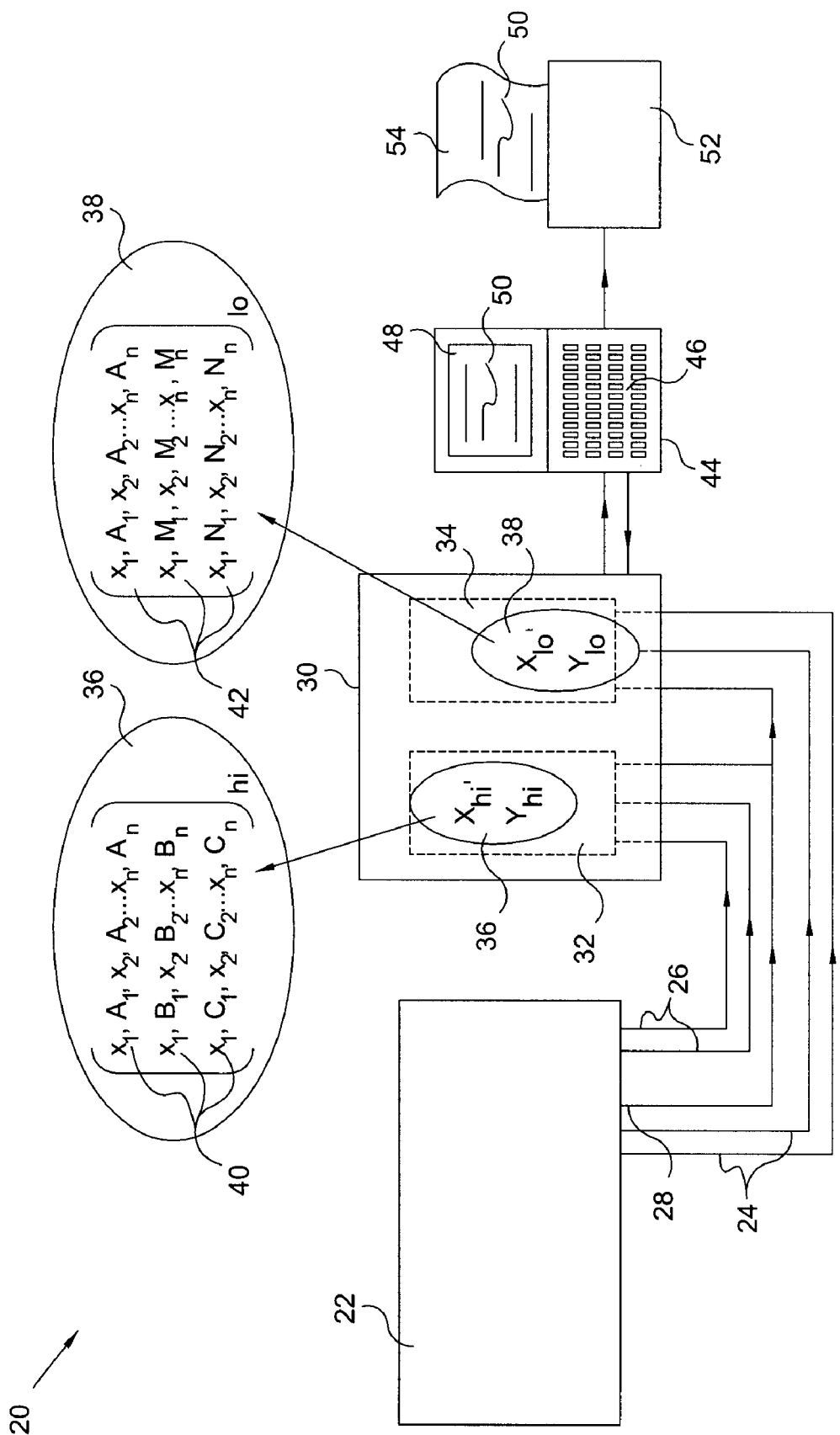
FIG. 1 is a schematic representation of a diagnostic system for an EP marking machine.

Referring to FIG. 1, the present invention includes a diagnostic system 20 for assessing operability of a machine 22. It should be understood that the diagnostic system 20, as well as the machine 22, may have more or fewer components than shown in FIG. 1, depending on manufacturing and/or consumer preferences.

The diagnostic system 20 includes a plurality of high-frequency inputs 26 and a plurality of low-frequency inputs 24 from the machine 22, and a process recorder 30 connected to the inputs 24 and 26. The inputs or signals corresponding to the inputs are retained in electronic files 32 and 34, containing respectively data sets of high-frequency data 36 and low-frequency data 38. Each of the data sets 36 and 38 contains a respective plurality of subsets 40 and 42, and each subset has a series of consecutive data points from a different input. FIG. 1 shows, by way of example, two each of the high and low-frequency inputs 26 and 24, and also one shared input 28 which provides data for both the high-frequency and low-frequency data sets 36 and 38. In practice, the total number of inputs may typically be ten or more, and several may be shared inputs such as 28. However, it is not precluded that each and every input will provide data for only one of the data sets 36 or 38.

The recorder 30 is a storage device for retaining the data sets 36 and 38. Preferably, the recorder 30 is a memory that retains the data sets independent to the powered status of the machine 22. The recorder 30 is selectively or permanently connected with a computer 44 having a keyboard 46 and a display 48. On provision of an appropriate command from the keyboard 46, the files 32 and 34 can be downloaded into the computer 44, and selected data retrieved therefrom. The selected data can be displayed as a graphic image 50 on the screen 48. Optionally, the computer 44 can be connected with a printer 52, and the image 50 can be printed out as a hard copy 54.

Figure 2:
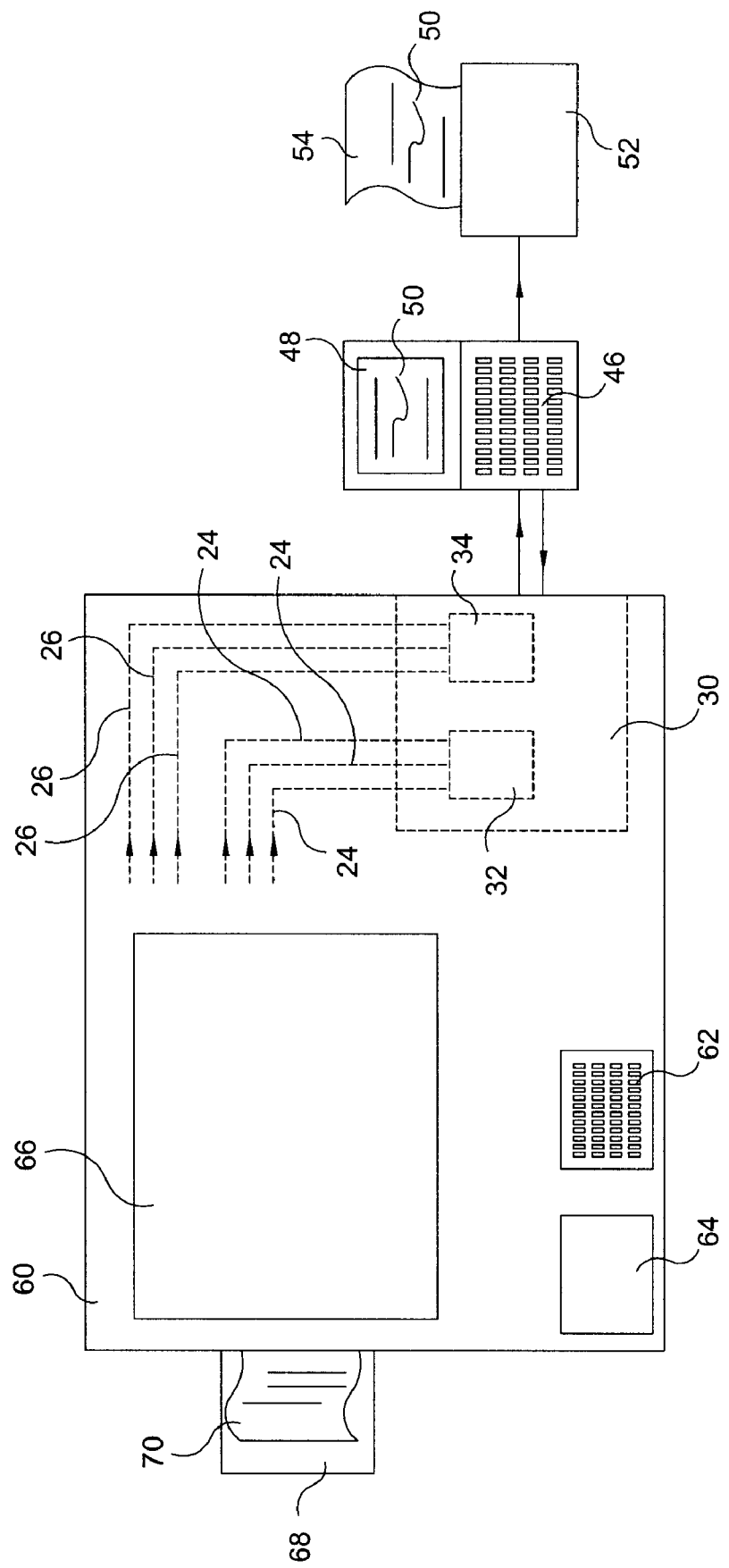
FIG. 2 is a schematic representation of an alternative configuration of a diagnostic system for an electrophotographic marking machine.

In a preferred embodiment of the invention, shown schematically in FIG. 2, the machine 22 is an EP marking machine or engine 60, such as a copier or printer. The EP machine includes the recorder 30. The EP machine 60 has a keypad 62 for entering commands, a screen 64 for prompting and displaying commands. a platen 66 for receiving an original document to be copied, and a tray 68 which can receive frames 70 printed by the copier 60. Neither an original for copying, which is placed on the platen 66, nor a platen cover are represented in the drawings. Also omitted from the drawings is any representation of an automatic feeder with which EP machines are commonly equipped. The computer 44 is any of a variety of computing devices including, but not limited to, dedicated servicing devices as well as laptop computers. The computer 44 and the EP machine 60 are configured to provide operable interconnection during a service call, so that the computer operably connects to the recorder 30. The operator can download the files 32 and 34 into the computer 44 and display selected data on the screen 48 as a graphic image 50. Optionally, the computer 44 is connected to a printer 52 to generate a hard copy 54 of the data. Alternatively, for the purpose of generating a hard copy, the computer 44 may be connected to the data input of the EP machine 60 to produce said hardcopy. It is understood that the graphical display and hard copy generation can be done during the service call or at a later time.

Figure 3:
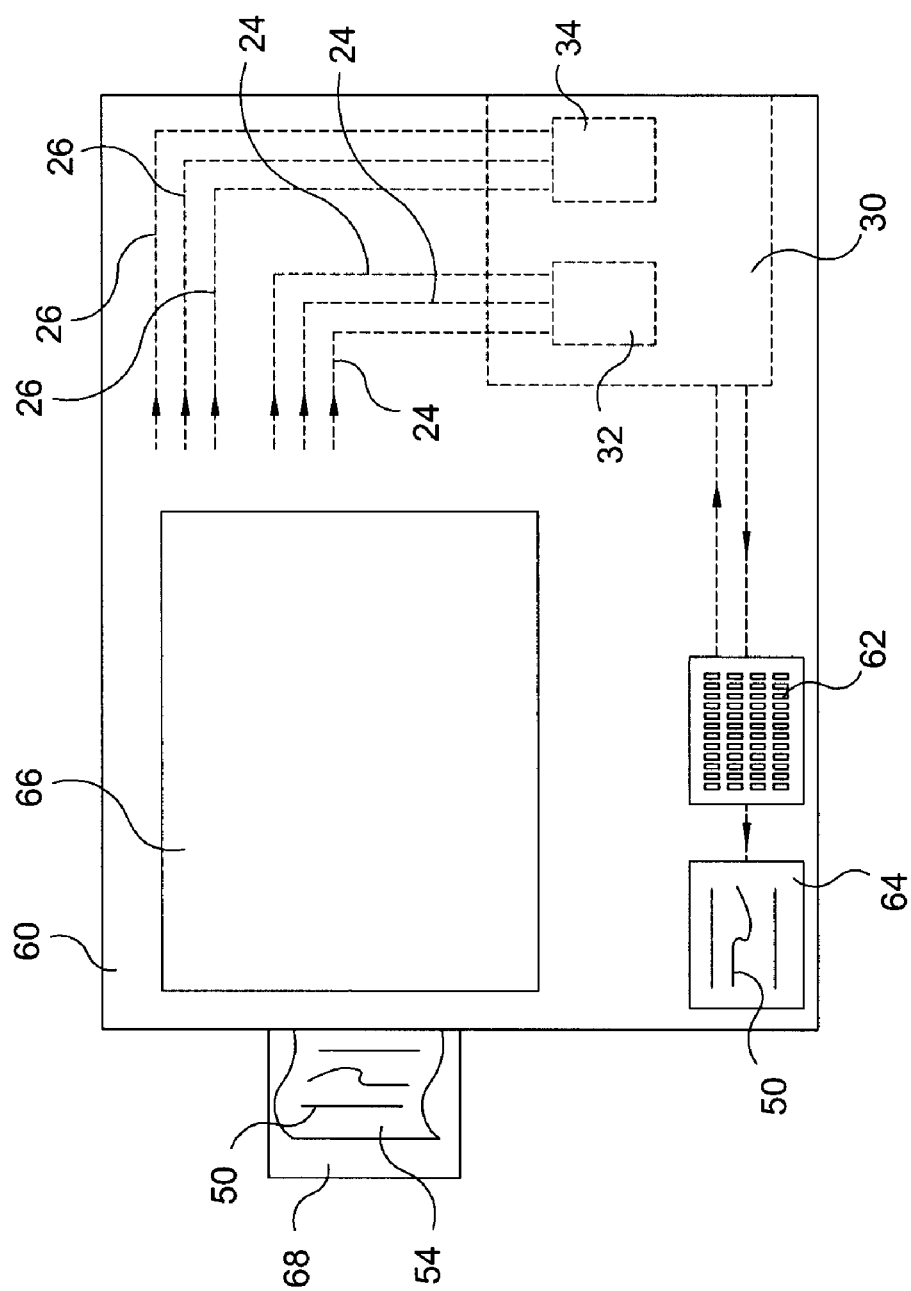
FIG. 3 is a schematic representation of a further configuration of a diagnostic system for an electrophotographic marking machine.

In another embodiment of the invention, shown schematically in FIG. 3, the EP machine 60 would host the recorder 30, while the keypad 62 and the screen 64 would not only serve to provide for the day-to-day operation of the EP machine, but would also be interactively connected with the recorder 30. The relationship between screen 62, the keypad 64 and the recorder 30 would be identical to that between the computer keyboard 46, the computer screen 48 and the recorder 30 in the preferred embodiment. This embodiment would be particularly convenient for a trained operator who would normally be stationed at the copier site.

The term EP History corresponds to the high frequency data set 36 and the term EP Trend corresponds to the low-frequency data set 38. A record of EP History (i.e., operation parameters) is useful for diagnosing the causes of actual malfunctions. For every printed marking or frame, key EP-parameters are recorded characterizing the operation of all imageforming subsystems. The high-frequency data set 36 includes all selected operation parameters for 1000 frames, i.e., the data recording is structured such that all selected operation parameters of the last 1000 frames are always available upon request. Should the printer stop with, e.g., a fatal error, the field/service engineer is able to access the last 1000 prints. Typical EP History includes values corresponding to such operation parameters as print counter, primary charger voltage, primary power supply setpoints, electrometer readback, densitometer output, transfer setpoint, film strain gauges, film voltage before exposure, film voltage after exposure, toner concentration, toner monitor, fuser thermistor, toning level sensor, toning bias, replenisher rate, fuser temperature, and process errors.

The EP Trend data provides a tool for analyzing the long-term drift of the operating conditions of the machine 22. The parameters of the low frequency (EP trend) data set may include values corresponding to print counter, date and time, film voltage before exposure, film voltage after exposure, toner concentration, toner concentration setpoint, developer life counter. Typically, the machine 22 includes software for setup or power up of the machine. The setup software applies each time the machine 22 is powered up. In addition, as many machines will run continuously (but for maintenance) the software includes an automatic, timed, execution. The powered up setup and the automatic initiated setup are termed "autosetups." With every completed autosetup, the achieved operating conditions are recorded in the low frequency data set as the EP trend data. Each occurrence of the autosetup results in the recording of key EP parameters. The EP parameters include the operating setpoints of the image-forming subsystems. Although the long term, EP trend data (low-frequency data set 38) includes all selected data for 500 autosetups, it is understood that the long term data set may include a fewer or greater number of points. The particular number of autosetups recorded is at least partially determined by the specific machine, the operating conditions as well as desired performance parameters. Thus, in the present example, the data recording is structured such that the selected operating conditions of the last 500 autosetups are maintained at the machine. Since the autosetup is initiated each time the machine is powered up, and typically every 6 hours (of continuous operation), approximately 200 workdays of trend data are normally included in the low frequency data set.

The following examples will provide a better understanding of the diagnostic system 20. However, assistance in trouble shooting the machine 22 accurately and effectively is not limited to the examples shown.

EXAMPLE 1

Error Analysis Using Data of the Short-Term Recorder

Figure 4:
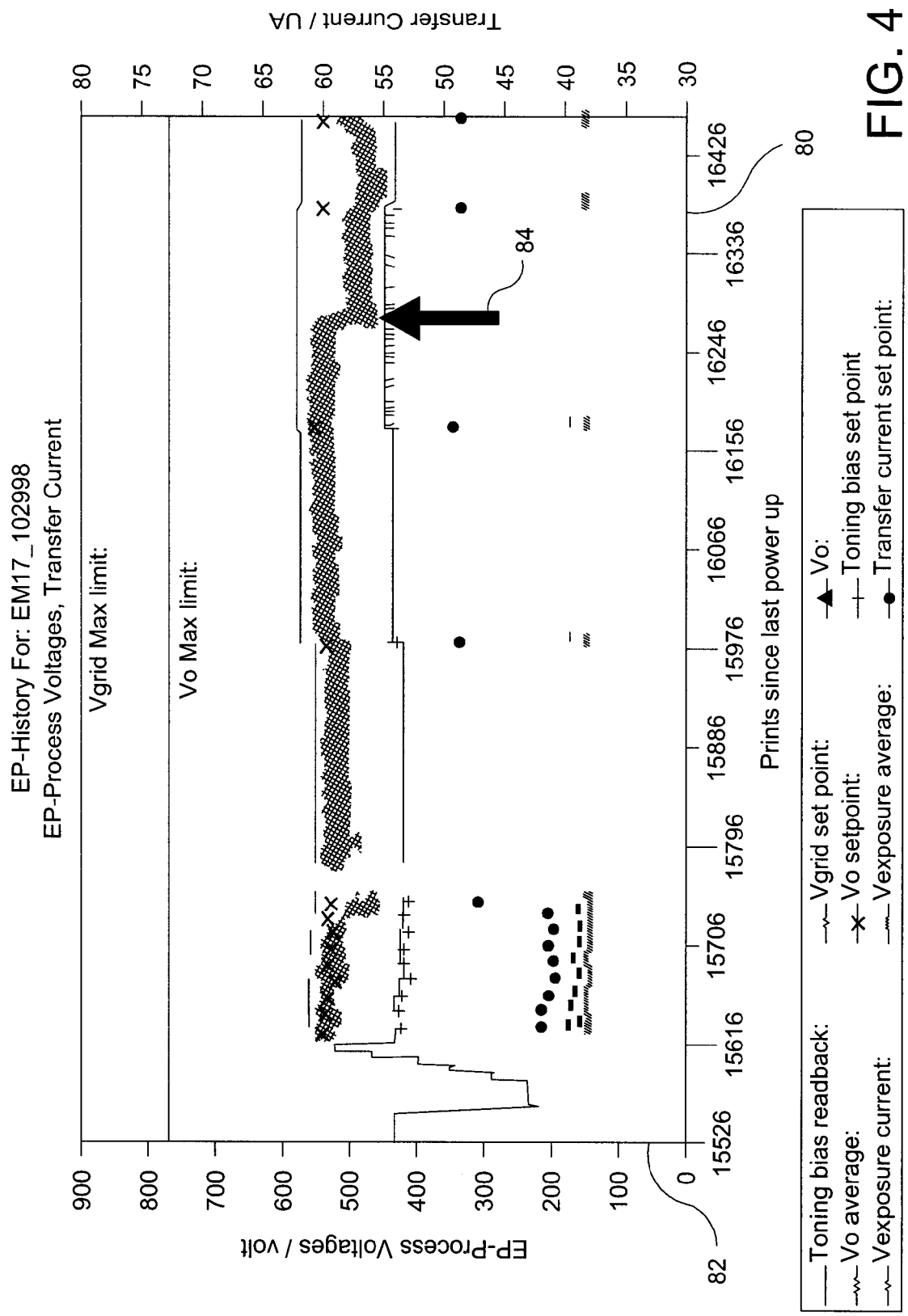
FIG. 4 is a graph of representative data.
Figure 5:
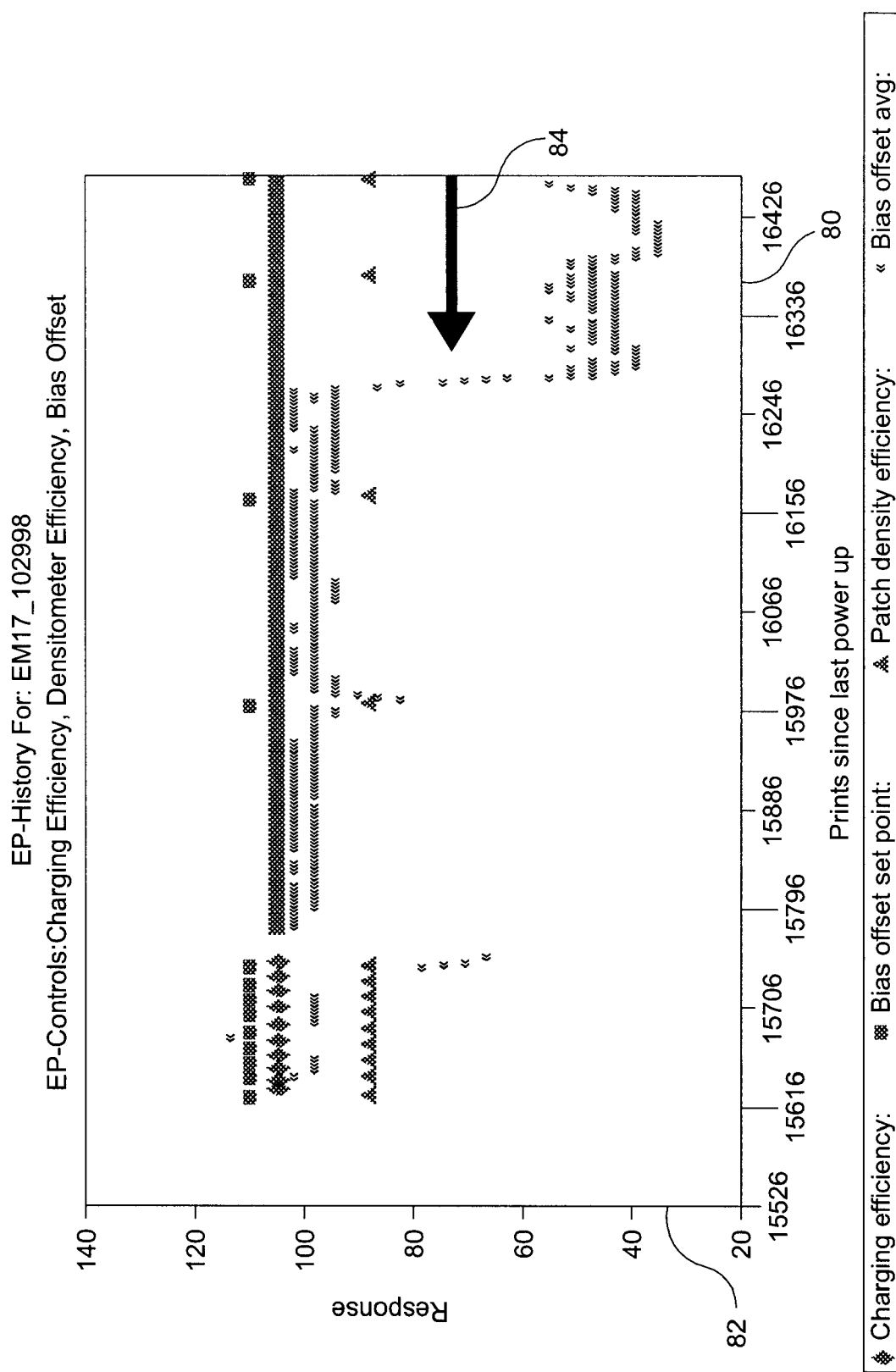
FIG. 5 is a graph of alternative representative data.

In an example depicted in FIGS. 4 and 5, the operator and the service technician of the printer observed the loss of developer at apparently random intervals. No cause or machine malfunction could be identified at the time of trouble shooting. Repeatedly, the developer was replaced. FIG. 4 shows a plot in which the x-axis 80 represents the number of frames printed since the last power-up, and the y-axis 82 represents any of a plurality of EP process voltages and also transfer current, which are parameters known in the art. In FIG. 5, the y-axis 82 represents EP controls over the same sequence of prints as those of FIG. 4. In particular, the recorded controls were charging efficiency, densitometer efficiency and bias offset, which again are terms known in the art. Analysis of the data revealed that the charger efficiency suddenly dropped causing the offset voltage $V_0$-$V_{bias}$ to drop from the desired 110V to only 40V. The incident is marked by arrows 84 in FIG. 4 ($V_0$ and $V_0$ average) and FIG. 5 (bias offset average). Similarly, the efficiency of the charger suddenly increased, causing an increase in the offset voltage from the desired 110V to about 170V. A material defect in the high-voltage plastic components of the charger was identified as the root-cause providing a low impedance electrical path to ground triggered by environmental conditions. The charger was replaced and the problems were resolved.

EXAMPLE 2

Trend Analysis Using Date of the Long-Term Recorder

Figure 6:
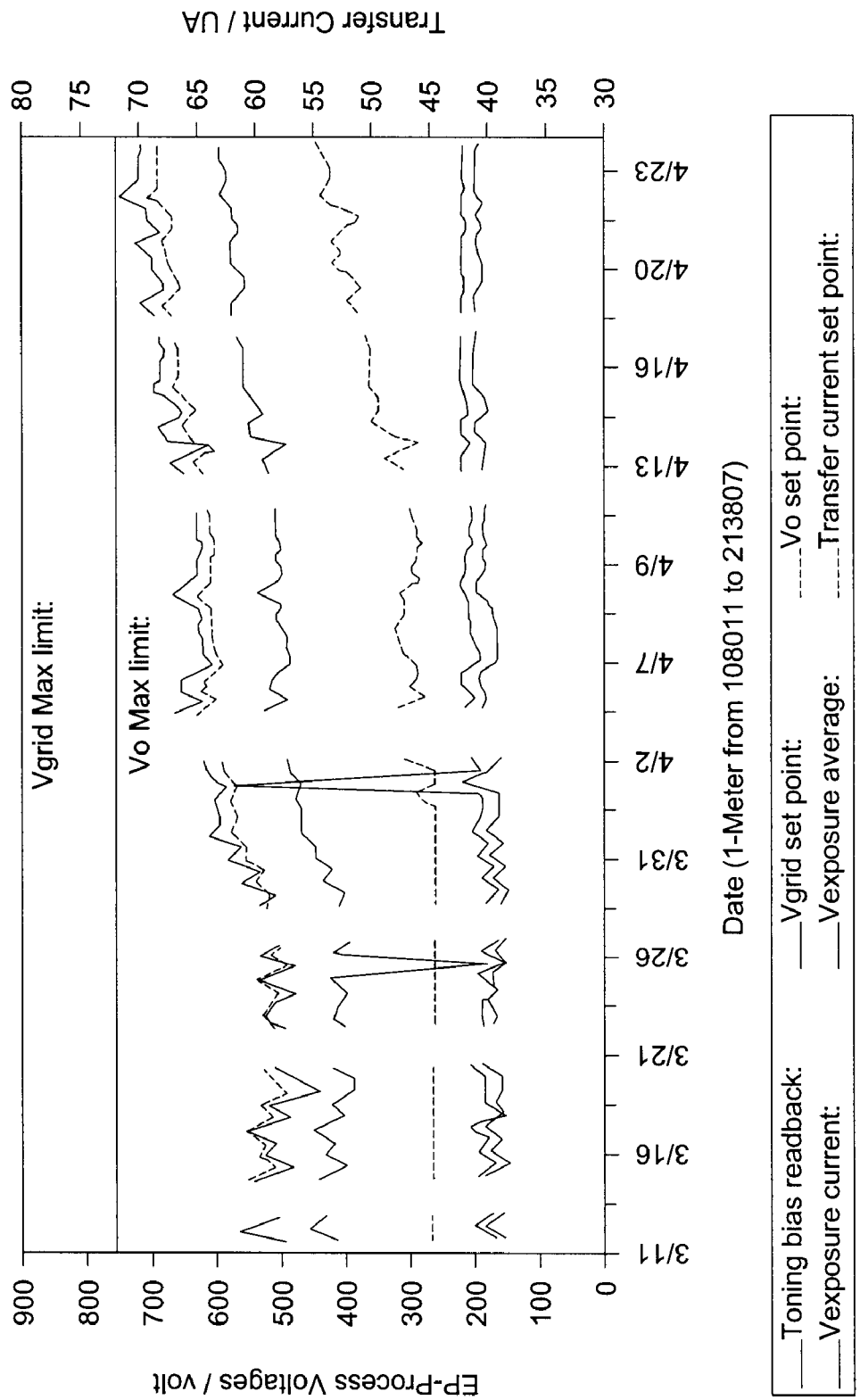
FIG. 6 is a graph of further representative data.

As components and consumables age, the image-forming subsystems degrade in their performance. Beyond certain limits, the image quality will suffer. With the long-term recorder incorporated into the marking engine controller (MEC), trends in operating setpoints of the image-forming subsystems can be analyzed and projections for end-of-life of consumables and/or components are based on data. In FIG. 6, the x-axis 80 is marked by dates covering about six weeks. Since each autosetup event is recorded in real time, the successive events can be plotted with reference to the x-axis 80, and trends observed. The example of FIG. 6 shows setpoint data for the primary charging system, the bias voltage, the voltage after exposure and the transfer current, which are represented by the y-axis 82. All setpoints are increasing as it is expected for new developer and a new photoconductor. With a very low monthly volume of about 55K images, the peak in operating points is not yet achieved. Towards the end-of-life of the developer the charge-tomass ratio of the developer will decrease and with it the setpoints. At the manufacturer's recommended values for the setpoints, the developer in terms of charge-to-mass ratio is very likely the limiting factor in achieving the desired image quality. The developer should then be changed.

Over time, the field engineer based on his own experience and knowledge of the customer job stream will be able to assess whether e.g. developer replacement should be performed while he is at the site or deferred until his next visit. In addition, since many EP process issues are charge-tomass (Q/m) related, the field engineer with his knowledge of the customer's jobstream can select a particular customer target indicating a Q/m-related artifact. As part of the field engineer's adaptive learning, the selected target printed at regular intervals (e.g. every service call) in conjunction with the recorded trend data will yield a customer specific profile for end-of-life of consumables and components. A customer specific profile for usage of consumables or components can further be augmented and refined by employing the use of fuzzy logic predictions rather than deterministic predictions of conventional programming tools. The combination of data recorded by the marking engine itself together with input by customer or field engineer into the maintenance database stored on the machine will after a learning period yield the customer profile.

The compositions of the high-frequency and low frequency data sets, 36 and 38 respectively, are selected based on their role in either short-term or long-term analysis. Each sample data set 36 and 38 is recorded at a different predetermined frequency. Some data are recorded in common for both long-term and short-term analysis, albeit at the different frequencies.

It is theoretically possible that the EP marking machine may be operable for extended periods with only minimal operation. Such an extreme but most unlikely circumstance could reverse the magnitudes of the frequencies or datagathering periods from those which would normally be expected. It will therefore be understood that in the foregoing specification, the usages "short-term", "long-term", "high frequency" and "low-frequency" are chosen because they overwhelmingly represent the normal manner of using the machine.

Error Context Sensitive Data Logging

Figure 7:
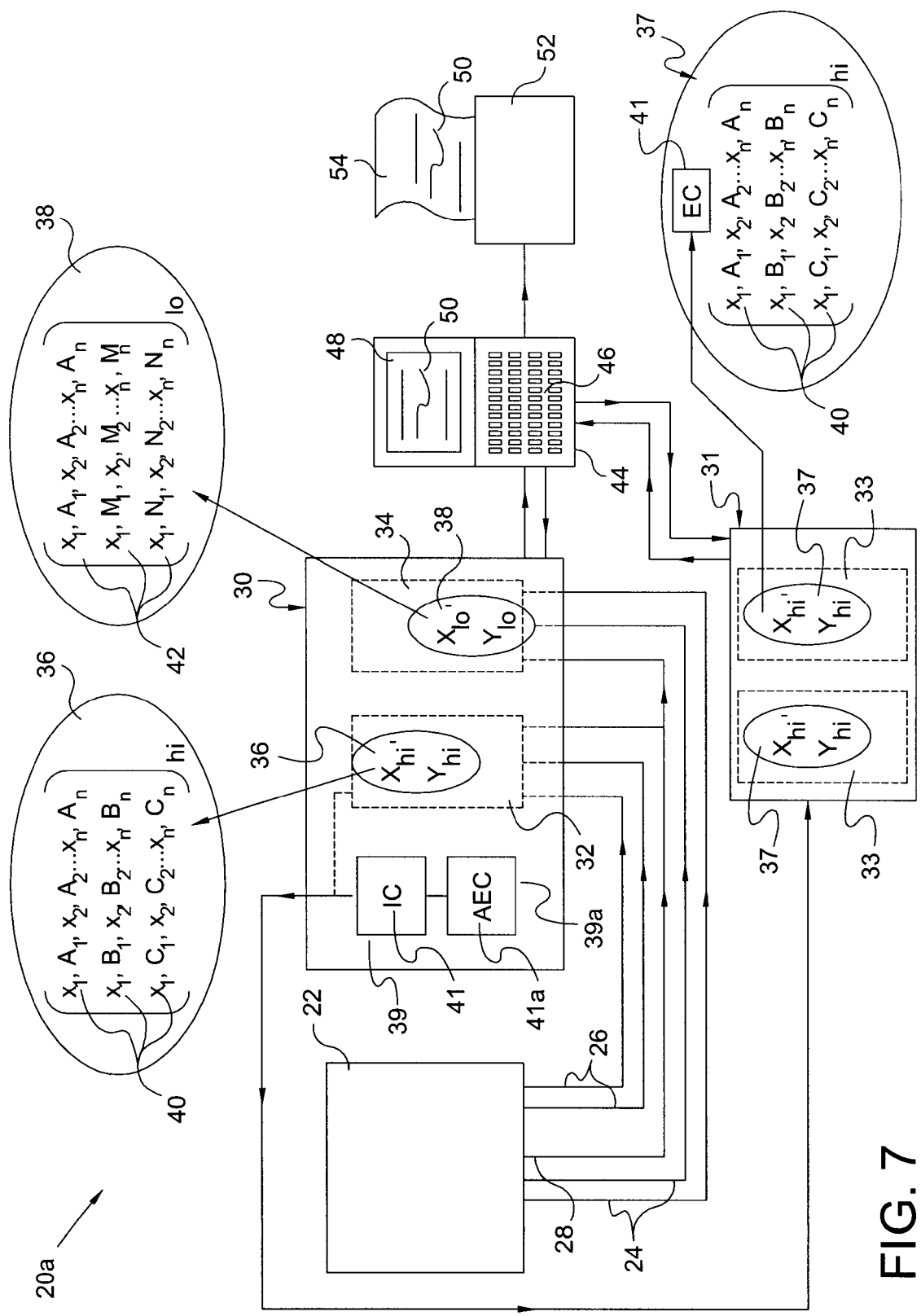
FIG. 7 is a schematic representation of a further diagnostic system for an EP marking machine.

FIG. 7 shows a further embodiment of a diagnostic system 20a for assessing operability of a machine 22. The diagnostic system 20a shown in FIG. 7 is identical to the diagnostic system 20 shown in FIG. 1, except that the diagnostic system 20a further comprises a pair of error tables 39, 39a that are integrated with, or at least connected to and in communication with, the recorder 30, as well as a non-volatile storage device 31 connected to and in communication with the recorder 30. For ease of illustration, and to avoid unnecessary repetition and redundancy, the diagnostic system 20a will only be shown and described herein with reference to a generic machine 22 that is separate from the recorder 30 and the computer 44. It should be understood, however, that the machine 22 of the diagnostic system 20a may be an EP marking machine or engine 60, such as a copier or printer, and that the recorder 30 and/or the computer 44 may be integrated into the EP marking engine 60 in the diagnostic system 20a (see FIGS. 2 and 3). In other words, the previously described embodiments shown in FIGS. 2 and 3 may be modified to include the error tables 39, 39a and the non-volatile storage device 31 of the diagnostic system 20a.

In the diagnostic system 20a, every error produced by and associated with a printed marking or frame is assigned an error code 41 (referenced in FIG. 7 as "EC"), which in turn is recorded by and stored in an error logging table 39. The error logging table 39 is preferably integrated into the recorder 30, as stated above, but may alternatively comprise a separate component of the diagnostic system 20a. As shown in FIG. 7, the error logging table 39 is preferably connected to and in communication with the electronic file 32 of the recorder 30 in order to obtain the error codes produced by a printed marking or frame, and is also preferably connected to and in communication with the non-volatile storage device 31. In addition, the error logging table 39 is further connected to and in communication with an active error table 39a that contains a predetermined set of criteria, which is preferably a list of one or more specific is and predetermined error codes 41a (referred to herein as "active error codes" and referenced in FIG. 7 as "AEC"). As with the error logging table 39, the active error table 39a is preferably integrated into the recorder 30, but may alternatively comprise a separate component of the diagnostic system 20a.

The active error codes may be set and configured by the user and/or field/service engineer of the machine 22. As explained in more detail below, the active error codes are used to trigger the permanent storage of the high frequency data set 36 contained within the electronic file 32 stored within the recorder 30, by passing the high-frequency data set 36 to the non-volatile storage device 31. Examples of such active error codes that may be used to trigger the transfer of the high-frequency data 36 that is to be stored in the non-volatile storage device 31 include $V_0$ at maximum, charging efficiency too low, densitometer reading to high, electrometer reading less than 150V, $V_0$ adjustment larger than allowed, etc. It should be understood that there may be any number of active error codes listed in the active error table 39a, depending on service and/or user preferences.

In the diagnostic system 20a, when an error code 41 is recorded by the error logging table 39 that matches one of the active error codes 41a contained within the active error table 39a, the entire contents of the electronic file 32 (i.e., the entire high-frequency data set 36), together with to the triggering error code 41, is preferably passed from the recorder 30 into the non-volatile storage device 31. The comparison between the error codes of the error logging table and the active error codes of the active error table is preferably integrated into the recorder 30, but may also be performed by the processor and software of the computer 44. Alternatively, additional hardware and/or software (not shown) other than the computer's processor and software may be used to for such a comparison.

The non-volatile storage device 31 is preferably connected to and in communication with not only the recorder 30, but also the electronic file 32 that contains the highfrequency data set 36, as well as the error logging table 39. As a result of this configuration, data from the highfrequency data set 36 and any triggering error codes 41 may be passed along to the non-volatile storage device 31 for more permanent storage. The non-volatile storage device 31 is a permanent storage device because it is not maintained on a first in, first out basis (FIFO), such as a hard disk. In contrast, the recorder 30 of the diagnostic system 20a is a volatile storage device, such as a memory buffer, that is maintained on a FIFO basis. As a result, the data stored in the recorder 30 continuously changes as new prints are run and new parameters are transferred into the recorder 30, while the data stored in the non-volatile storage device 31 is "permanently" maintained until actively deleted by a user. In any event, both the non-volatile storage device 31 and the volatile recorder 30 preferably retain their stored/recorded data at any given time independent to the powered status of the machine 22.

As shown in FIG. 7, the non-volatile storage device 31 comprises one or more electronic files 33 that each contain a data set 37 of high-frequency data (referred to herein as "error data") from the electronic file 32 of the recorder 30, and the error code 41 that triggered the transferring and permanent storage of such error data 37. Each error code 41 is preferably associated with its electronic file 33 and its error data 37 in such a manner as to allow a field/service engineer to easily search for and locate an electronic file 33 and a set of error data 37 based on the associated error code 41. The error data is preferably comprised of all of the subsets 40 of the consecutive data points or parameters stored in the recorder 30 that corresponding to each of a plurality of printed markings or frames. For example, if data points or parameters are recorded in the electronic file 32 of the recorder 30 for the last 1000 prints, the same data points or parameters for those 1000 prints are transferred and stored in the non-volatile storage device 31 when an active error code is triggered. Alternatively, however, it is conceivable that fewer than all of the data points or parameters (e.g., only the data points or parameters for the last 500 prints, rather than all 1000 prints) may be transferred to and stored by the non-volatile storage device 31, depending on service and/or user preferences.

As shown in FIG. 7, the non-volatile storage device 31 is selectively or permanently connected with the computer 44. As with the electronic files 32 and 34, any electronic file 33 may then be downloaded into the computer 44, and selected error data 37 retrieved therefrom. The selected error data may be displayed as a graphic image 50 (e.g., list, table, graph, etc.) on the screen 48. Optionally, the computer 44 may be connected with a printer 52, and the image 50 can be printed out as a hard copy 54. Alternatively, for the purpose of generating a hard copy, the computer 44 may be connected to the data input of the EP machine 60 to produce said hardcopy.

Figure 8:
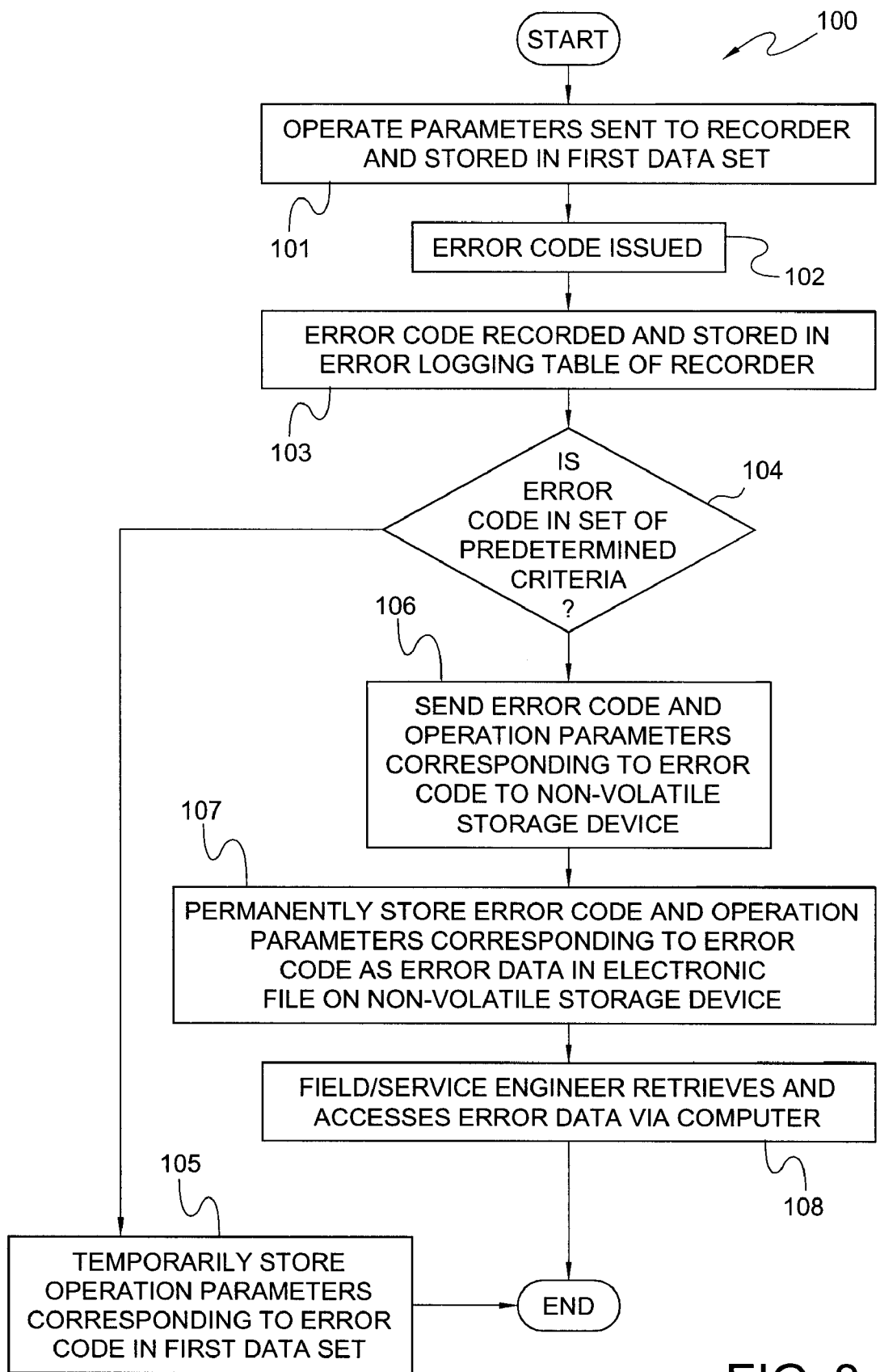
FIG. 8 is a flow diagram illustrating a method for monitoring operation parameters of an EP marking machine with the diagnostic system of FIG. 7.

The operation of the diagnostic system 20a, as well as a method 100 for monitoring operation parameters of an EP marking machine with the diagnostic system 20a, will now be described with reference to FIG. 8. For ease of illustration purposes only, error codes will be used in the method 100 for the predetermined criteria that provides the basis for selecting the error data 37 of the non-volatile storage device. It should be understood that the predetermined criteria may be any number of different factors, depending on operating and/or maintenance preferences. The method 100 begins with Step 101, wherein the operation parameters (or data points) of the marking machine for each printed marking or frame are sent to the recorder 30 and stored in a first data set (e.g., the high frequency data 36 of the electronic file 32). An error code is then issued in Step 102, and the error code is recorded by and stored in the error logging table in Step 103.

A determination is then made in Step 104 as to whether the error code is listed in the predetermined criteria for the non-volatile storage device 31. In the previously described embodiment of the diagnostic system 20a, this step would involve comparing the error code to the list of active error codes contained within the active error table. If the error code is not listed (e.g., the error code is not an active error code), then the operation parameters corresponding to the error code are temporarily stored on the recorder 30 in the first data set (Step 105), and the method 100 ends. On the other hand, if the error code is listed in the predetermined criteria (e.g., the error code is an active error code), then the issued error code and the entire content of the first data set (e.g., the high frequency data 36 of the electronic file 32) corresponding to the issued error code are sent from the recorder to the non-volatile storage device in Step 106. The transferred content preferably comprises the entire content of the first data set that existed (i.e., present in the recorder 30) at the time the error code was issued. Thus, since the content of the first data set is preferably always changing as new operation parameters are added and old ones are deleted on a FIFO basis, the content of the first data set that is transferred to the non-volatile storage device may be referred to herein as a second data set. As noted above, however, it should be understood that the second data set may include less than the entire content of the first data set at any given time.

In Step 107, the issued error code and the operation parameters corresponding to the issued error code are permanently stored as error data (e.g., error data 37) in an electronic file (e.g., the electronic file 33) located on the non-volatile storage device. Once stored in the electronic file on the non-volatile storage device, the error data may be retrieved and accessed by an operator and/or field/service engineer via a computer (e.g., computer 44) in Step 108. More specifically, the field/service engineer may search for and retrieve the error data based on its associated error code, which is preferably maintained in the electronic file stored on the nonvolatile storage device.

It should be understood that while the non-volatile storage device 31 is shown as a separate component in FIG. 7, it may be readily combined with the volatile storage device (i.e., recorder 30) to form an integral storage device with both volatile and non-volatile recording capabilities. It should also be understood that while data is described as being transferred from the recorder 30 to the non-volatile storage device 31 in the diagnostic system 20a, data may be sent directly to the non-volatile storage device 31 without passing through the recorder 30. For example, the high-frequency inputs 26 (as well as any shared inputs 28) may be connected to and run through the computer 44, before being connected to both the recorder 30 and the non-volatile storage device 31. In such an example, the computer 44 would include the error logging table 39 and the active error table 39a for the necessary comparison of error codes and triggering of permanent data storage, and the data carried by the inputs 26, 28 may be directed to either the recorder 30 or the non-volatile storage device 31, or both, by the computer 44.

In addition, it should be understood that the active error code trap and the non-volatile storage device may be disabled and deactivated in the diagnostic system by the operator and/or field/service engineer, if so desired. With the active error code trap being disabled, the operation parameters are stored solely in the volatile recorder 30.

While the present invention has been described in terms of an EP marking machine, it is understood, the invention can be employed with process lines and manufacturing. In particular, the invention may be employed with coating processes, production or creation of products.

According to the present invention, the error context sensitive storage of EP-process data, such as operation parameters, causes the marking engine (or other machine) to automatically accumulate EP-process data leading to preselected errors and failures. The field/service engineer can retrieve multiple EP-process data sets from the permanent storage device and analyze the data, e.g., with respect to similarities leading to the same error and/or failure. Similarly, with multiple error and/or failure codes initiating the error context sensitive data logging according to the present invention, the field/service engineer is enabled to trouble-shoot marking engine malfunctions without relying on the operators description and/or the time consuming recreation of the error and/or failure conditions.

The present invention has been described in connection with certain embodiments, but it is not intended to limit the scope of the invention to the particular forms set forth. On the contrary, it is intended to cover such alternatives, modifications, and equivalents as may be included within the spirit and scope of the invention as defined by the appended claims.

What is claimed is:

1. An electrophotographic marking machine comprising:
    a first set of data including a plurality of parameters corresponding to a plurality of prior electrophotographic markings;
    a second set of data selected from the first set of data based upon a predetermined set of criteria;
    a volatile storage device for storing the first set of data; and
    a non-volatile storage device for storing the second set of data.

2. The electrophotographic marking machine of claim 1 wherein the volatile storage device is a memory buffer that is maintained on a first in, first out basis.

3. The electrophotographic marking machine of claim 1 wherein the non-volatile storage device is a hard disk.

4. The electrophotographic marking machine of claim 1 wherein the volatile storage device is a memory buffer that is maintained on a first in, first out basis, and the non-volatile storage device is a hard disk.

5. The electrophotographic marking machine of claim 1 wherein the predetermined set of criteria includes at least one error code.

6. The electrophotographic marking machine of claim 1 wherein the first set of data includes parameters corresponding to a predetermined number of electrophotographic markings.

7. An electrophotographic marking machine for producing a plurality of frames comprising:
    a first set of data including a plurality of parameters corresponding to the plurality of frames;
    a second set of data selected from the first set of data based upon a predetermined set of criteria;
    a volatile storage device for storing the first set of data; and
    a non-volatile storage device for storing the second set of data.

8. The electrophotographic marking machine of claim 7 wherein the plurality of frames are sequential.

9. The electrophotographic marking machine of claim 7 wherein the volatile storage device is a memory buffer that is maintained on a first in, first out basis.

10. The electrophotographic marking machine of claim 7 wherein the non-volatile storage device is a hard disk.

11. The electrophotographic marking machine of claim 7 wherein the volatile storage device is a memory buffer that is maintained on a first in, first out basis, and the non-volatile storage device is a hard disk.

12. The electrophotographic marking machine of claim 7 wherein the predetermined set of criteria includes at least one error code.

13. A method for assessing operability of an electrophotographic marking machine, the method comprising the steps of:
    recording a first set of data including a plurality of parameters corresponding to a plurality of prior electrophotographic markings;
    storing the first set of data in a volatile storage device;
    selecting a second set of data from the first set of data based upon a predetermined set of criteria; and
    storing the second set of data in a non-volatile storage device.

14. The method of claim 13 further comprising the step of using a memory buffer that is maintained on a first in, first out basis for the volatile storage device.

15. The method of claim 13 further comprising the step of using a hard disk for the nonvolatile storage device.

16. The method of claim 13 further comprising the steps of using a memory buffer that is maintained on a first in, first out basis for the volatile storage device, and using a hard disk for the non-volatile storage device.

17. The method of claim 13 further comprising the step of using at least one error code for the predetermined set of criteria.

18. The method of claim 13 further comprising the step of using parameters corresponding to a predetermined number of electrophotographic markings for the first set of data.

19. The method of claim 13 further comprising the step of using the predetermined set of criteria associated with the second set of data to identify the second set of data on the nonvolatile storage device.

20. The method of claim 13 further comprising the steps of using at least one error code for the predetermined set of criteria, associating the at least one error code with the second set of data, and using the at least one error code associated with the second set of data to identify the second set of data on the non-volatile storage device.

* * * * *